Figure 1:
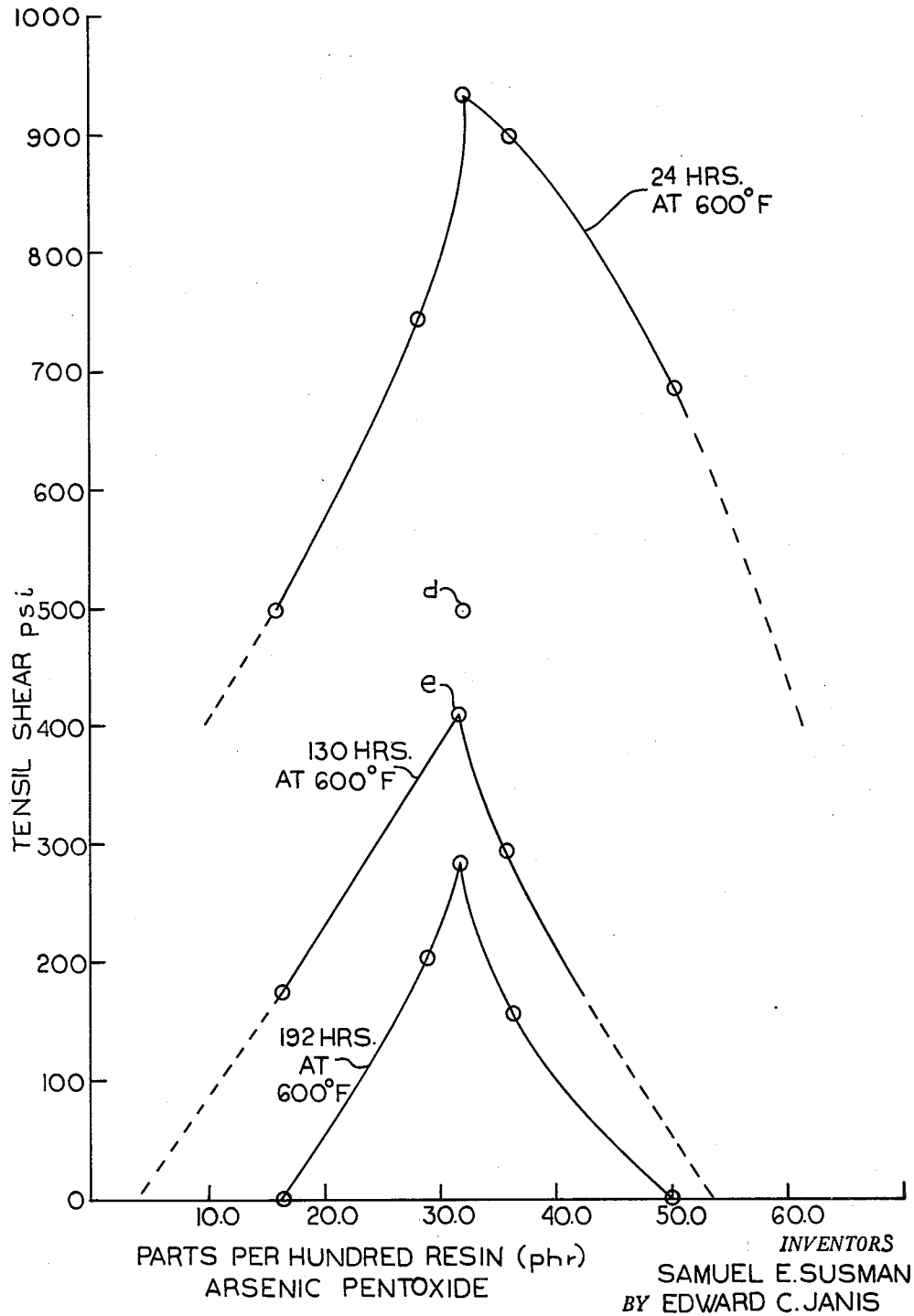

United States Patent Office 3,014,893
Patented Dec. 26, 1961

3,014,893
CURED EPOXY RESIN MATERIAL
Samuel E. Susman and Edward C. Janis, San Diego, Calif., assignors to Narmco Industries, Inc., San Diego, Calif., a corporation of California
Filed Feb. 19, 1959, Ser. No. 794,407
7 Claims. (Cl. 260—47)

This invention relates generally to improvements in the epoxy resin class of materials and, more specifically relates to the formation of novel cured epoxy materials having substantially increased thermal stability and resistance to oxidative degradation at elevated temperatures, as well as having other advantageous physical and chemical properties and end uses.

The epoxy resin classification, as used herein and in the claims, covers both the combined epoxy resins (such as epoxy-novolak, epoxy-melamine, or epoxy-silicone resins) and the bisphenol A type of epoxy resins. The term epoxy resin as used herein, and in the claims, denotes an uncured resin of the epoxy type, but may include reinforcing materials or fillers. The reinforcing materials and the fillers used are conventional. For example, fibrous glass, aluminum powder, or asbestos can be employed.

Epoxy resins of the prior art have almost invariably been hitherto cured with organic curing agents or hardeners of the aromatic amine (including polyamine) or anhydride chemical class. A list of conventional curing agents for epoxy resins follows:

Diethylenetriamine
    Triethylenetetramine
    Diethylaminopropylamine
    Metaphenylenediamine
    Diaminodiphenylsulfone
    Menthane diamine
    Dicyandiamide
    Phthalic anhydride
    Dodecenyl succinic anhydride
    Hexahydrophthalic anhydride
    Chlorendic anhydride
    Pyromellitic dianhydride
    Maleic anhydride The cured epoxy resins of the prior art possess many excellent characteristics such as good wetting and adhesion to metals, and excellent dimensional stability as well as chemical resistance. Epoxy resins cured with pyromellitic dianhydride (PMDA) were generally found to be among the better systems in terms of retention of adhesive strength upon aging in air at elevated temperatures of the order of 400 to 500° F. for several hundred hours. However, it has been found that the conventionally cured epoxy resins of the prior art, including those cured by PMDA, lose substantially all their bond strength at temperatures above 500° F. upon aging in air for periods of several hundred hours.

Bearing in mind the foregoing facts, it is a major object of the present invention to provide a cured epoxy resin having superior aging characteristics as well as other advantageous physical and chemical properties, than those presently known and to provide a process for making said superior resin.

A further object of the present invention is to provide a novel cured epoxy resin having superior physical characteristics as an adhesive and a bonding agent, as a coating compound agent, as a potting and encapsulating compound, as a laminating compound, as a mold and die material, and as a foam material.

Still another object of the present invention is to provide a novel cured epoxy resin wherein the epoxy resin is cured with one or more compounds selected from a group of inorganic amphoteric oxide compounds.

Yet a further object of the present invention is to produce a novel cured epoxy resin composition which incorporates inorganic amphoteric oxide compounds, as well as conventional curing compounds.

A further object of the present invention is to provide a novel cured epoxy resin which has substantially increased thermal stability and resistance to oxidative degradation at elevated temperatures.

Still another object of the present invention is to provide a novel cured epoxy resin which retains bond strength even after aging in air at temperatures above 500° F. for substantially longer periods of time than has been hitherto known.

Figure 2:
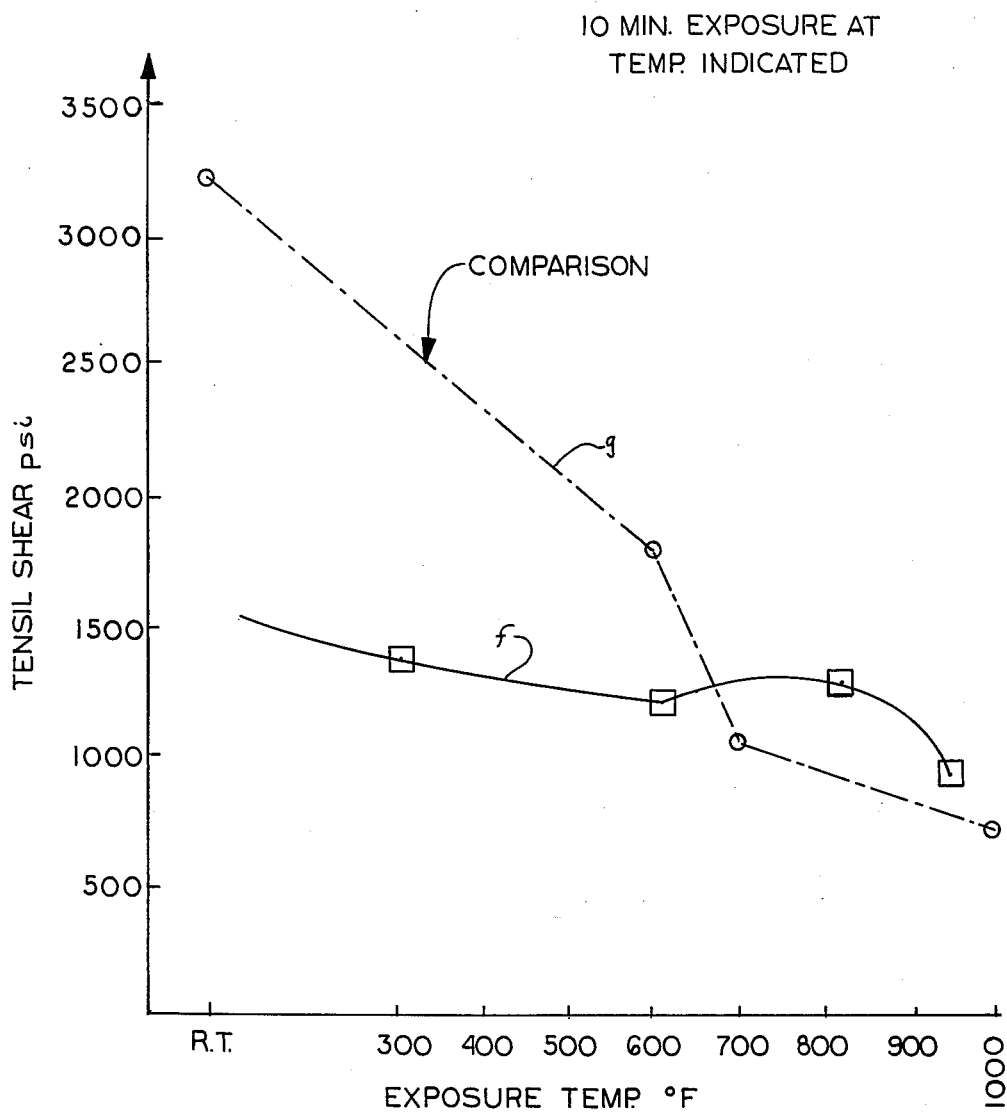
Figure 3:
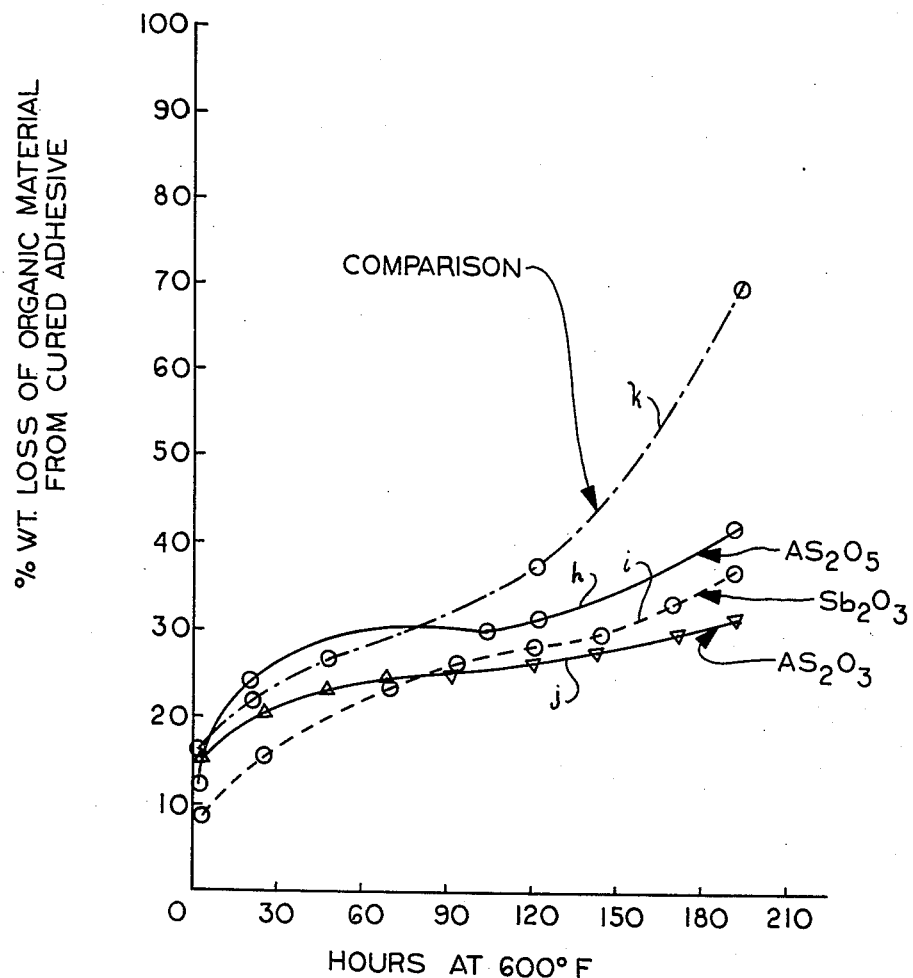

These and other objects of the invention will be clearly understood by referring to the following detailed description and to the figures in which:

FIGURES 1 and 2 are graphs showing the thermal stability under aging conditions, of our novel cured epoxy resin; and FIGURE 3 is a plot of weight loss of various novel cured epoxy resins against exposure at elevated temperature.

In general, the novel composition of matter of the present invention comprises the incorporation of an inorganic amphoteric oxide into an epoxy resin prior to the curing step. A conventional organic amine or organic anhydride curing agent may or may not be added depending upon the desired properties of the cured resin.

The term "inorganic amphoteric oxides" is defined herein, and, in the claims, as an oxide which is capable of acting as both an acid and a base. Certain inorganic amphoteric oxides have been found to have the greatest effect on the aging properties of the cured epoxy resin. These oxides are the various oxides of the following elements:

Phosphorous,
    Arsenic,
    Antimony,
    Bismuth,
    Tin,
    Lead, and
    Germanium.

These elements all fall within groups IV and V of the periodic table of elements.

Generally speaking, it has been found that the addition of an inorganic amphoteric oxide (in even small proportion) to an epoxy resin (containing a conventional curing agent) will significantly improve the adhesive bond strength of the cured epoxy as compared to a conventionally cured epoxy lacking the inorganic amphoteric oxide. For example, the bond strength of dicyandiamide cured epoxy resins is approximately zero p.s.i. after aging for 192 hours at 500° F. The bond strength of the same epoxy resins cured with the same conventional curing agent and 1.5 parts of an amphoteric oxide, such as arsenic pentoxide ($As_2O_5$), per 100 parts of epoxy resin have a bond strength of approximately 500–700 p.s.i., depending on the particular epoxy used, when subjected to the same aging conditions just described.

Thus it can be seen that the reaction product of even a small amount of an inorganic amphoteric oxide with an epoxy resin, this system incorporating also a conventional curing agent, results in substantial improvements in the thermal stability of the final cured epoxy resin.

It has also been found that upon increasing the amount of inorganic amphoteric oxide with the epoxy resin that the amount of conventional curing agent can be decreased substantially with resulting improved adhesive bond strength under aging conditions at elevated temperature.

Further, upon the addition of a sufficient amount of an inorganic amphoteric oxide (the absolute value of which varies depending upon the particular epoxy resin employed) the conventional curing agent can be completely dispensed with since the inorganic amphoteric oxide acts as the curing agent itself.

For example, if 32 parts of arsenic pentoxide are added to an epoxy resin and cured (without the addition of any conventional curing agent), the resulting cured epoxy resin will withstand a 500° F. exposure in air for 1000 hours and still have a bond strength of 400–500 p.s.i., depending upon the particular epoxy resin used.

Essentially, the total replacement of the PMDA curing agent by the arsenic pentoxide in an epoxy resin system results in a cured epoxy resin having a substantial greater bond strength after aging then does a PMDA cured epoxy resin or a PMDA-inorganic oxide cured epoxy resin. However, as pointed out above, the addition of the oxide into a PMDA-epoxy resin prior to curing is also highly advantageous.

Thus, the amounts of inorganic amphoteric oxide may vary from an extremely low amount, in proportion to epoxy resin, to an extremely large amount where the temperature of exposure of the cured resin is approximately 500° F. The range lies between about 1 part to about 60 parts of oxide per 100 parts of epoxy resin. The epoxy resins which were cured with from about 27–35 parts per hundred of resin (phr.) of any one of the inorganic amphoteric oxides, and without the addition of PMDA or other conventional curing agents, proved to be the optimum products from the point of view of resistance to oxidative degradation at temperatures of about 500° F. over long periods of time.

The optimum ratios of 27–35 parts inorganic amphoteric oxide to epoxy resin holds true as the temperature of exposure increases from 500° F. to 1000° F.

Referring now to FIGURE 1, the relationship of thermal stability, at a 600° F. exposure, of an epoxy-novolak (Dow Chemical Co. X–2638.1)-PMDA formulation is plotted. The bond strength is given as tensile shear (p.s.i.) and the amount of the inorganic amphoteric oxide (arsenic pentoxide) is given as parts per hundred (phr.) of epoxy resin. The data on bond strength was obtained by bonding the cured resins to 17–7 pH stainless steel which was first treated with a phosphate etch bath, as is described hereafter in Example 1.

Referring particularly to cures a, b, and c, it will be seen that the period of exposure of the cured resins is 24, 72, and 192 hours respectively.

For every period of exposure it will be noted that the optimum bond strengths occurred when the amount of arsenic pentoxide was approximately 27–35 phr. As the amount of arsenic pentoxide is increased or reduced from the optimum range, the bond strengths of the cured epoxy resin drops off rapidly for each of the periods of exposure.

The operable range, that is, the range within which the arsenic pentoxide, or the other inorganic amphoteric oxides, are effective to some degree in aiding thermal stability lies from approximately 1 phr. to 26 phr. on the low side of the optimum range and from 36 to 60 phr. on the high side of the optimum range.

When the PMDA is completely omitted from the epoxy-novolak resin, and the resin is thus cured only with 32 phr. of arsenic pentoxide the thermal stability of the resulting cured epoxy resin is represented by the point d on FIGURE 1. The bond strength, after aging at 600° F. for 192 hours is seen to be approximately 190 p.s.i. greater than if the corresponding PMDA-arsenic pentoxide-epoxy novolak formulation, the bond strength of which is represented by the point e. It should be noted that when the aging of any particular cured resin is conducted at a lower temperature, e.g. 500° F., the bond strength increases considerably.

Referring now to FIGURE 2, a plot of bond strength versus exposure temperature (° F.) is set forth for a short time exposure of 10 minutes. Curve F shows the thermal stability of representative epoxy resin cured with 32 phr. of arsenic pentoxide (no PMDA or other conventional curing agent being present). Curve g is a comparison curve of a comparable resin cured with a conventional curing agent, no inorganic amphoteric oxide being present.

It will be noted that in the temperature range of approximately 600° F. to 1000° F. that the arsenic-oxide cured epoxy resin is substantially superior in bonding strength for the same period of short time exposure.

The optimum range, with respect to the amount of the inorganic amphoteric oxide added to the epoxy resin are 27–35 phr., as noted before, with respect to long time exposure. Also, the wider limits with respect to the amount of the amphoteric oxide added to the epoxy resin are applicable, viz. 1 to 60 parts of inorganic amphoteric oxide per hundred parts of epoxy resin.

Referring now to FIGURE 3, a graph is there shown which is a measure of the oxidative degradation of a cured epoxy-novolak (Dow X–2638.1) resin, at an elevated temperature. The resin contained an aluminum powder filler for viscosity control in an amount equal to 1 part of filler per 1 part of resin. The graph is a plot of weight loss of organic material from the cured resin as a function of the hours of exposure at a temperature of 600° F. The weight loss is a measure of the thermal stability of the cured resin, the less the weight loss, the greater the stability, the converse also being true.

Referring particularly to curves h, i, and j, the weight loss of an arsenic pentoxide cured epoxy-novolak resin, of an antimony trioxide epoxy-novolak resin, and of an arsenic trioxide epoxy-novolak resin are shown respectively. They are approximately the same as a measure of thermal stability, although the arsenic trioxide appears consistently better from this point of view. The epoxy-novolak resin cured with the oxides of the amphoteric oxides of phosphorous, bismuth, tin, lead and germanium may be said to have approximately the same curves for weight loss versus aging at elevated temperatures.

Curve k represents the thermal stability of a PMDA cured epoxy-novolak resin with no addition of inorganic amphoteric oxide. The weight loss is substantially greater than the resins cured with the inorganic amphoteric oxides after about 60 hours of exposure to air at 600° F.

While an epoxy-novolak has been used by way of example, it will be understood that this epoxy resin is representative of the class of epoxy resins with respect to reaction with the inorganic amphoteric oxides. These epoxy resins which may be used have a 1,2 epoxy equivalency greater than 1.0. By the "epoxy equivalency," reference is made to the average number of 1,2 epoxy groups contained in the average molecule of the reaction product.

The reason for the superior properties of the epoxy resin cured, in whole, or in part, with an inorganic amphoteric oxide is not absolutely certain. However, it appears that a new composition of matter has been formed by means of a polymerization reaction between the inorganic amphoteric oxide and the epoxy resin.

Specific examples of the cured epoxy resin formulations of this invention are set forth below:

EXAMPLE I

*Epoxy-novolak, PMDA, arsenic pentoxide system*

|  | Pts. by weight |
|---|---|
| Epoxy-novolak X–2638.1 (mfd. by Dow Chemical Company) | 100.0 |
| PMDA | 14.7 |
| Filler (aluminum powder) | 100 |
| Arsenic pentoxide | 32 |

The epoxy resin, PMDA, arsenic pentoxide system was applied to a 17–7 pH stainless steel, and cured under 50 p.s.i., and at 550 degrees F., for approximately 1 hour.

A preferred pre-treatment of the stainless steel, prior to application of the epoxy resin, consists in first pretreating the part in a phosphate etch bath comprising approximately 800 ml. of concentrated hydrochloric acid, 90 ml. of concentrated phosphoric acid, and 40 ml. of concentrated hydrofluoric acid. A water rinse of the part is then necessary prior to application of the epoxy resin. Other pretreatments, such as a sodium dichromatic sulfuric acid etch, or a sanded surface, are satisfactory.

The bond strength of the cured resin, after application to a 17-7 pH phosphate treated stainless steel was 1670 p.s.i. After aging the steel in air for 192 hours at 600 degrees F., the bond strength decreased to 290 p.s.i.

The bond strength of the same cured resin, but employing only PMDA as the curing agent and maintaining the curing conditions substantially identical with those described above resulted in a bond strength of zero (0) after 192 hours. The greatly increased resistance to aging is thus clearly seen.

EXAMPLE II

*Epoxy-novolak and arsenic pentoxide system*

The composition shown in Example I was modified by omitting PMDA entirely. The curing temperature was maintained at approximately the same temperature but for a 3 hour period of time. The pressure remained approximately the same as in the Example I.

The bond strength of the thus cured resin to 17-7 pH stainless steel (treated with a phosphate etch as described) was 470 p.s.i. after exposure in air at 600 degrees F. for 192 hours.

It can thus be seen that the curing properties of the arsenic pentoxide, as well as the aging properties, are very much superior to an epoxy-PMDA system alone, or to the combination of the epoxy resin with PMDA and Arsenic Pentoxide.

EXAMPLE III

| | Pts. by weight |
|---|---|
| Epon 1310 (a modified bisphenol A epoxy manufactured by Shell Chemical Corp.)—a 70% solution in toluene | 100 |
| Arsenic pentoxide | 32 |

The resin was cured at 600 degrees F. for 3 hours at 50 to 75 p.s.i. A post cure was effected over a period of 24 hours at 500 degrees F.

The bond strength of the cured resin was 370 p.s.i. after a 100 hour exposure in air at a temperature of 600 degrees F. The same resin, when cured with PMDA only (and no inorganic amphoteric oxide) had no bond strength after 24 hours of exposure in air at 600 degrees F. The same resin, when cured with methyl nadic anhydride only, failed at 50 hours of exposure in air at 600 degrees F.

EXAMPLE IV

| | Pts. by weight |
|---|---|
| Silicone-epoxy (an epoxy resin manufactured by Dow Corning Q2-80903) | 100 |
| Arsenic pentoxide | 32 |

The epoxy resin was cured by raising the temperature of the arsenic pentoxide and epoxy resin mixture to 600 degrees F., and maintaining this temperature over a period of 3 hours under a pressure of 50 to 75 p.s.i. A post cure was effected at 500 degrees F. for 24 hours.

The bond strength of the cured resin after exposure in air at 600 degrees F. for 192 hours was 555 p.s.i. The same resin, when cured with PMDA only, no arsenic pentoxide being present, had no bond strength after a 192 hour exposure at 600 degrees F.

EXAMPLE V

| | Pts. by weight |
|---|---|
| Epon 828 (a condensation polymer of epichlorohydrin and bisphenol-A, bisphenol-A being the common means of referring to para, para'-isopropylidenediphenol—manufactured by Shell Chemical Company) | 100 |
| Arsenic pentoxide | 30 |
| Ethylene glycol | 26 |

The glycol was added to accelerate the curing cycle. After heating for ½ hour at 230 degrees F. and ½ hour at 302 degrees F. the system was applied to warm aluminum panels and cured for 6 hours at 250 degrees F. and 8 hours at 300 degrees F. at 30 p.s.i.

The average tensile shear strength of resin, tested at room temperature and at 180 degrees F. was 2445 p.s.i.

While several detailed embodiments of the invention are here described, various changes and modifications can be made that lie within the scope of the invention. Hence, it is intended that the scope of the invention shall be defined by the appended claims.

We claim:

1. The process of producing a cured epoxy resin which comprises heating an epoxy resin having a 1,2 epoxy equivalency greater than 1.0, produced by the reaction of a polyhydric phenol with a 1,2-epoxy-3-halohydrin, in the presence of a curing agent, said curing agent consisting essentially of an amphoteric oxide selected from the group consisting of the oxides of antimony, arsenic, tin, bismuth, lead and germanium at a temperature sufficiently high to effect the cure of said resin.

2. The process according to claim 1 wherein said epoxy resin is heated at a temperature of at least 500° F. in the presence of said curing agent.

3. The process according to claim 1 wherein said amphoteric oxide is present in an amount of between about one and sixty parts by weight per 100 parts of epoxy resin.

4. The process of producing a cured epoxy resin which comprises heating an epoxy resin having a 1,2 epoxy equivalency greater than 1.0, produced by the reaction of a polyhydric phenol with a 1,2-epoxy-3-halohydrin, in the presence of a curing agent consisting essentially of an oxide of arsenic at a temperature of about 600° F., said oxide of arsenic being present in an amount of about 27 to 35 parts by weight per 100 parts of said epoxy resin.

5. The process according to claim 4 wherein said oxide of arsenic is arsenic pentoxide.

6. The process according to claim 4 wherein said oxide of arsenic is arsenic trioxide.

7. The process of producing a cured epoxy resin which comprises heating an epoxy resin having a 1,2 epoxy equivalency greater than 1.0, produced by the reaction of a polyhydric phenol with a 1,2-epoxy-3-halohydrin, in the presence of a curing agent consisting essentially of an oxide of antimony at a temperature of about 600° F., said oxide of antimony being present in an amount of about 27 to 35 parts by weight per 100 parts of said epoxy resin.

References Cited in the file of this patent

UNITED STATES PATENTS 2,528,934     Wiles     Nov. 7, 1950